March 17, 1953  I. B. PURDY  2,631,637
ANTISKID DEVICE
Filed Feb. 11, 1949  3 Sheets-Sheet 1
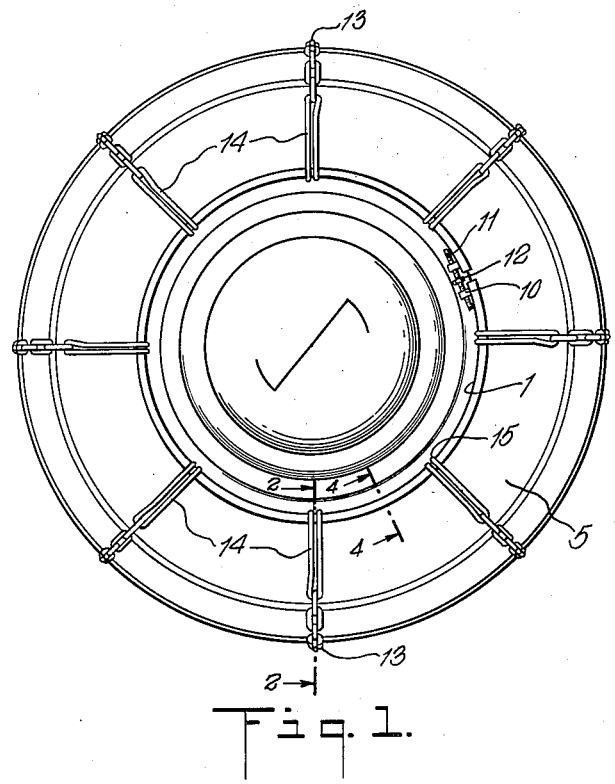
Fig. 1.
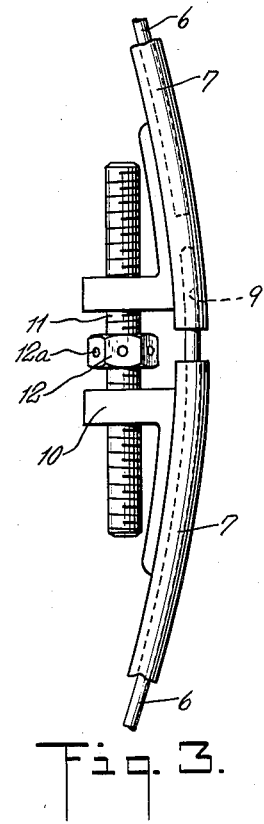
Fig. 3.
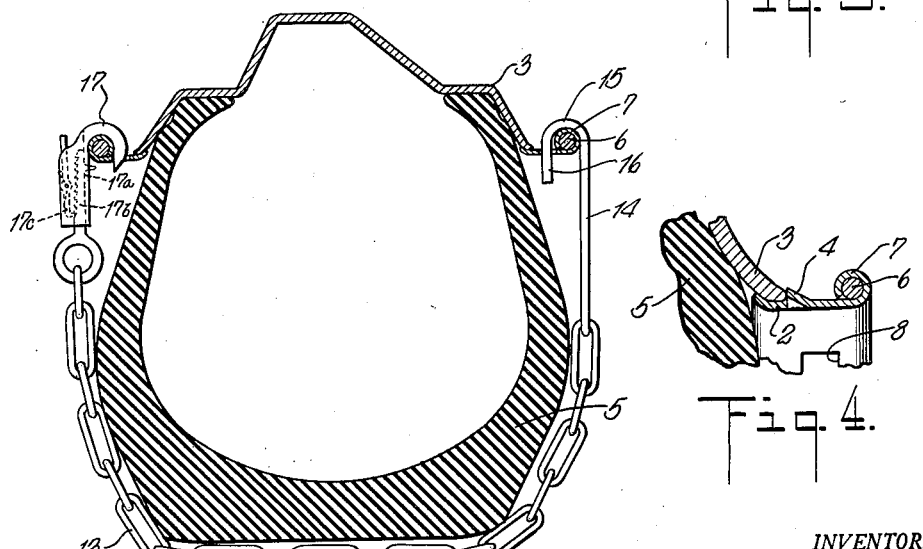
Fig. 2.
Fig. 4.
INVENTOR.
IRVING B. PURDY
BY Kenyon & Kenyon
ATTORNEYS March 17, 1953 — I. B. PURDY — 2,631,637
ANTISKID DEVICE Filed Feb. 11, 1949 — 3 Sheets-Sheet 2

INVENTOR.
IRVING B. PURDY
BY
Kenyon & Kenyon
ATTORNEYS

March 17, 1953 — I. B. PURDY — 2,631,637
ANTISKID DEVICE
Filed Feb. 11, 1949 — 3 Sheets-Sheet 3
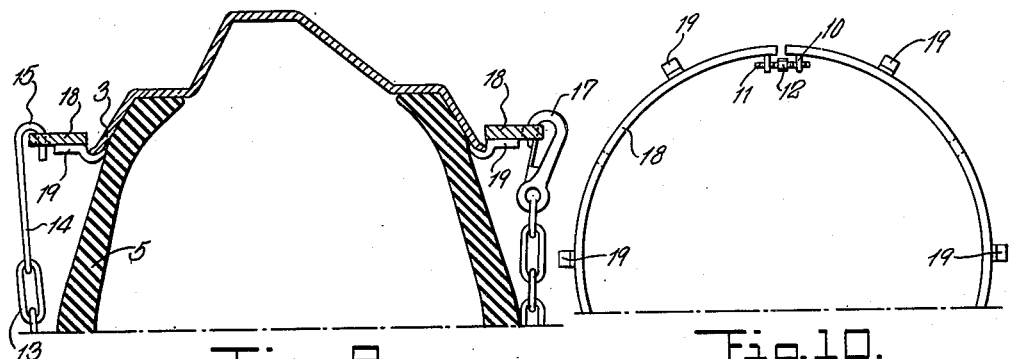
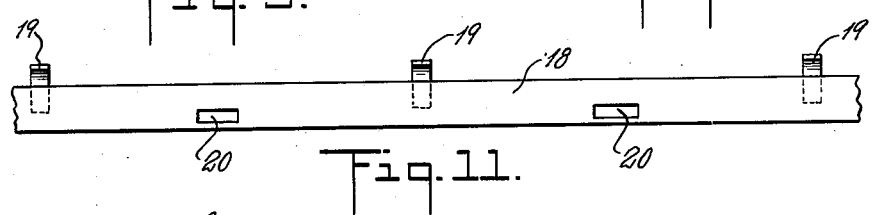
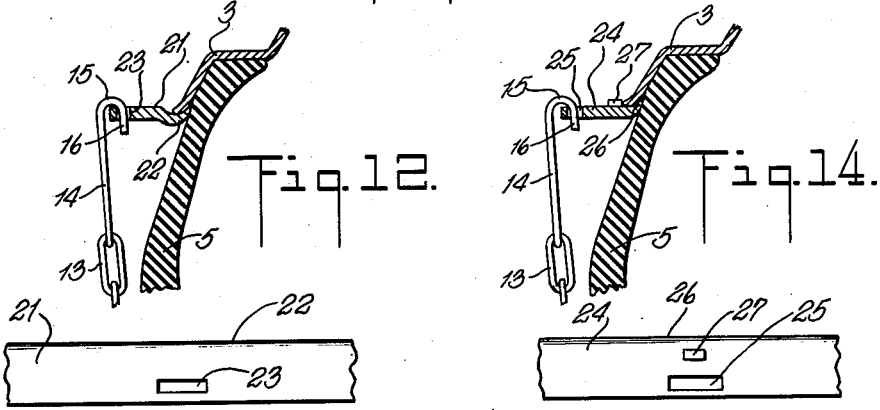
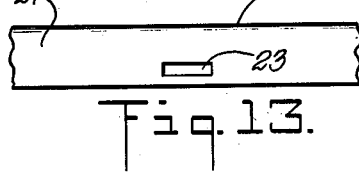
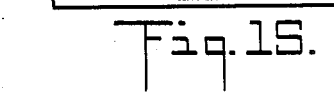
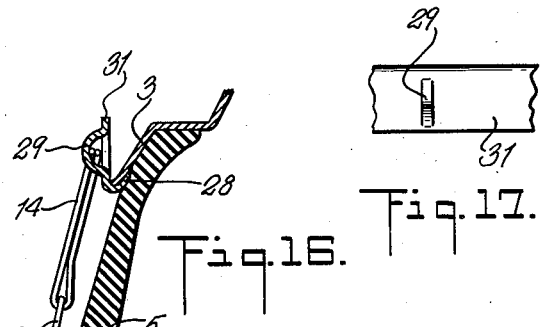
INVENTOR.
IRVING B. PURDY
BY Kenyon & Kenyon
ATTORNEYS Patented Mar. 17, 1953

2,631,637

UNITED STATES PATENT OFFICE 2,631,637

ANTISKID DEVICE

Irving B. Purdy, Pleasantville, N. Y.

Application February 11, 1949, Serial No. 75,929

4 Claims. (Cl. 152—236)

This invention relates to an anti-skid device for automobile vehicle wheels having tire rims flaring at least slightly away from the tire side walls. Such wheels are exemplified by those on all current automobiles.

One of the objects is to provide a device of the type including anti-skid cross strand attachment devices adapted to remain on the wheel at all times whether the cross strands are used or not, but which may be applied to or removed from the wheel when desired without requiring the wheel to be disfigured for this purpose and without necessitating deflation and inflation of the inner tube of a pneumatic tire mounted on the wheel rim. Another object is to provide a device facilitating the attachment of the ends of cross chains to the side of the wheel next the vehicle. A further object is to provide a device permitting attainment of either or both of the preceding objects and which is of sufficiently simple and sturdy construction to permit its economical manufacture and to permit it to remain on a wheel during prolonged periods when anti-skid protection is potentially needed without interfering with the safe operation of the vehicle or causing operational trouble.

More specifically the purpose is to provide a device of the type embodying an annulus for application to both sides of the wheel rim and which is adapted for connection with the ends of one or more anti-skid cross strands with the connection established so that connection and disconnection of the cross strand or strands is easy and safe. The prior art has attempted to provide devices of this type, but the attachment of the annuli involved disfigurement of the wheel or necessitated sufficient deflation of a pneumatic tire mounted on the wheel to permit considerable separation of the tire side walls from the rim. The present invention avoids these disadvantages. Furthermore, the present invention provides annuli which may be easily attached to the opposite edge peripheries of the wheel rims even by those unskilled in mechanical work.

Another distinguishing feature is that the device provides a combination of the annuli and one or more anti-skid cross strands which facilitate the connection of the strand end or ends on the side of the wheel next the vehicle where any attachment arrangement is of necessity relatively inaccessible, particularly in the case of modern automobiles. Specific examples of the present invention are illustrated by the accompanying drawings, in which:

Fig. 1 is a side view of an automobile wheel of the disk type wherein the manufacturer has not provided openings for the convenience of those desiring to use anti-skid cross chains individually provided with applying straps, with one example of the invention applied to this wheel to equip it with anti-skid protection;

Fig. 2 is a cross section of the rim of the wheel shown by Fig. 1, and of the device exemplified in Fig. 1;

Fig. 3 is an enlargement taken from Fig. 1 to show a constructional detail;

Fig. 4 is a cross sectional view similar to Fig. 2 but showing a detail of the device located at a different circumferential position than that through which Fig. 2 is cut;

Fig. 6 is similar to Fig. 4, but shows the inner end of a special anti-skid cross strand connecting member being applied to the annulus on the side of the wheel toward the vehicle;

Fig. 7 is similar to Fig. 6, but shows the special connection engaged with the annulus and represents the attempt of a person to establish full connection when he cannot see what is going on;

Fig. 8 shows how the connection is automatically established fully without undue difficulty by moving the connection peripherally along the annulus to a proper connecting locality in a manner presently described more fully;

Fig. 9 is similar to Fig. 2, but shows a modification;

Fig. 10 is a side view of a modification shown by Fig. 9 as it appears when removed from the wheel rim and with the anti-skid cross strands removed;

Fig. 11 is a view similar to Fig. 5, but showing the modifications of Figs. 9 and 10;

Fig. 12 is similar to Fig. 4, but shows a further modification;

Fig. 13 is a view similar to Fig. 5, but shows the modification of Fig. 12;

Fig. 14 is similar to Fig. 4, but shows still a further modification;

Fig. 15 is similar to Fig. 5, but shows the modification of Fig. 14;

Fig. 16 is a view similar to Fig. 4, but shows still another modification;

Fig. 17 is similar to Fig. 5, but shows the modification of Fig. 16; and

Fig. 18 is also similar to Fig. 4, but shows an additional modification.

Figure 5:
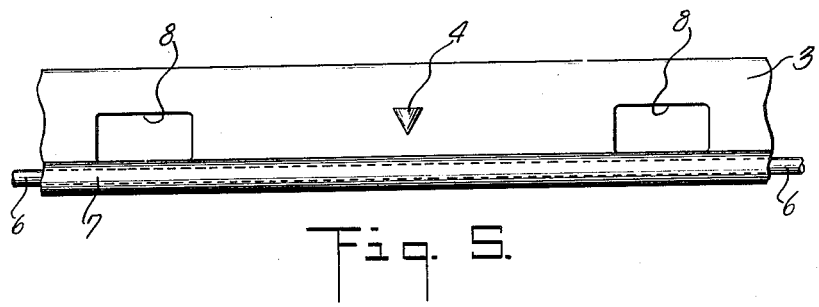
Fig. 5 is a view of a portion of the device looking axially outwardly from the wheel and showing the association of the annulus details illustrated separately by Figs. 2 and 4.

Referring now to Figs. 1 through 8, the device includes two annuli 1 which may be identical if desired. Therefore, a description of one annulus suffices for the present.

The annulus 1 is shown as a flat metal band that is looped substantially cylindrically with one edge 2 curved radially inwardly to hook behind the wheel rim 3 and with abutments 4 spaced from its curved edge 2 a distance adapting the abutments to engage the outside of the rim 3 to hold the curved edge 2 from sliding too far inwardly between the rim 3 and the tire 5 mounted thereby. The abutments 4 are shown as comprising a plurality of peripherally spaced partial punches made in the metal band from which the annulus 1 is formed. The proportions of the curved edge 2 and abutments 4, and their arrangement, depends on the particular make of wheel rim involved. There may be instances where a number of different makes of wheel rims are sufficiently similar so that without change they may all be fitted and there may be instances where special designing is needed.

The other edge of the metal band forming the annulus 1 may have a reinforcing wire 6 extending peripherally therealong and connected therewith by this other edge being looped around the wire 6 as at 7 to position the wire and also define an inwardly extending flange. When the annulus is applied to the wheel rim this flange formed by the wire 6 and the looped band portion 7 cooperate with the outside of the wheel rim 3 to define an inwardly facing channel.

Peripherally spaced holes 8 are formed in the metal band annulus between the band edges which form the axial ends of the annulus.

The annulus 1 formed by the band is axially split to define circumferential ends whereby the annulus is contractible and expansible radially. The band is designed to be flexible enough to permit this radial expansion and contraction.

As shown by Fig. 3 the wire 6 also has separable ends like the band forming the annulus proper, but the ends of the wire are offset relative the ends of the band. Therefore, the looped portion 7 of the band forms an open socket at one end while the ends of the wire 6 projects from the other end of the band and slides in this socket as shown at 9, in Fig. 3. This keeps the ends of the annulus registered at all times. As also shown by Fig. 3, the annulus is provided with means for contracting and expanding it. This means is illustrated as comprising lugs 10 applied to the opposite ends of the annulus and through which is screw threaded a screw 11 providing right and left hand threads, respectively, engaging the two lugs 10. This screw is provided with a central portion 12 for permitting the use of a wrench in turning the screw. When the screw is turned one way it expands the annulus and when it is turned the other way it contracts the annulus. Since the force is applied by the screw in either direction, expansion and contraction of the annulus is easily done manually.

The abutments 4 are of importance when the screw 11 is used to fasten the annulus to the wheel rim. These abutments prevent the annulus from slipping toward the wheel so as to permit its inwardly curved portion 2 to slide only a limited distance, if at all, inside the rim 3 between the latter and the tire. Another important point is that the inwardly flared rim portion 2 is made just sufficiently long enough to function as an annular hook for hooking on to the inside of the rim edge. This portion 2 need not be made so long that it extends between the rim 3 and the tire 5 so there is no chance for engaging the tire and possibly wearing its side wall. Because of this arrangement of parts the device may be removed from the rim without deflating the inner tube of the tire 5 and without necessitating any special attachment means applied to the wheel or its rim and consequently disfiguring it when the annulus is removed.

The anti-skid cross strands are illustrated as comprising cross chains 13. Each annulus must provide one of the holes 8 for each of the cross chains 13. Preferably, provision is made for sufficient cross chains to approximate the effect of standard anti-skid chains. Although it is contemplated that in many instances only one or two anti-skid cross strands will be used, the thought is that even this relatively meager use is frequently sufficient to get a vehicle out of the stalled condition due to snow, mud, sand, etc. with the user applying only sufficient cross strands for this purpose and then removing them when the vehicle is put into an operative position by their use.

Each cross strand is provided at one end with a special connection in the form of a long shank 14 terminating with a hook 15 having a point 16. The shank 14 may be in the nature of four to six inches long. The end of the hook is regarded as its point regardless of the fact that it may not be literally pointed, but may have a flat end as illustrated. The end of the cross strand provided with the long shanked hook is intended for application to that one of the annuli which is applied to the side of the wheel toward the vehicle where any type of fastening is usually out of sight of the user and relatively inaccessible. This is particularly true in the case of a wheel bogged down in soft material.

Figures 6, 7, 8:
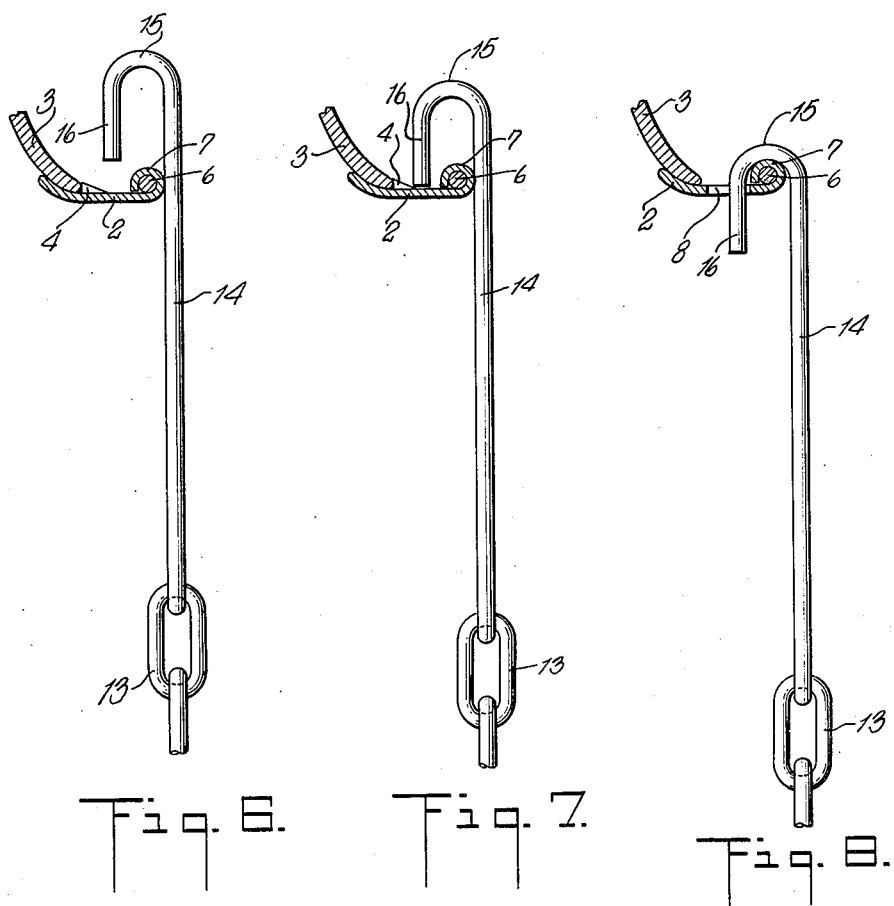

With the above in mind the connection of the inner strand end may be established easily and simply by putting the point 16 of the hook 15 in the channel defined between the inwardly facing flange formed by the outside of the wheel rim 3 and the inwardly extending flange formed by the reinforcing wire 6 and the portion 7 of the band that is looped about the wire so as to substantially enclose it. Fig. 6 shows the hook above this channel and Fig. 7 shows contact between the point 16 and the web of the channel formed by the main body of the annulus between its axial ends. The throat of the hook is proportioned so that when the shank 14 is simply rested against the outside of the channel arrangement and then pulled, the point 16 is automatically guided to the web.

The percentage of chance for registering the point 16 with one of the holes 8 is relatively small, but there is no chance for the point failing to reach a position as shown by Fig. 7 illustrating an unregistered condition. Now with the point riding in the channel with the latter functioning as a guideway, the user of the device simply slides the point along by using the long chain 14 as a convenient handle until the point registers with one of the holes 8, as shown by Fig. 8, whereupon the point drops into the hole and the hook 15 firmly engages the annulus portion 7 where it is reinforced by the reinforcing wire 6. In this fashion the inner ends of the strands may be attached to the annulus on the side of the wheel toward the vehicle without any difficulty even in the case of modern cars or when the wheel is bogged down in soft material.

The other ends of the strands 13 may be provided with any convenient connection for engaging the annulus on the outside of the wheel. The working conditions there are open and do not cause difficulty. Therefore, it is convenient to use a special hook 17 having a shank 17a in the form of a socket in which a ratchet bar 17b is slid and retained by a releasable pawl 17c. This bar connects with the cross chain and tightens the latter when pushed into the socket or shank 17a. If this makes the hook 17 resist release the pawl 17c may be released to obtain sufficient looseness to permit unhooking.

Should it prove desirable the device comprising the combination of the two annuli and the anti-skid cross strands may be made so that one of the annuli does not provide for the inwardly facing channel. Then this annulus may be applied to the side of the wheel away from the vehicle. However, this introduces danger of confusion and it is preferred to make the annuli duplicates to avoid any chance for getting them mixed during their installation. In case the other advantages are not desired, the annuli might be otherwise attached to the wheel rim and provided with an inwardly facing channel formed by parts working either with or without cooperation with the wheel rim, and with the web of the channel provided with openings for receiving a hook.

Referring now to Figs. 9 to 11, a modification is shown wherein the annulus is formed by a plain flat metal band 18 that is looped cylindrically and provided with attached, peripherally spaced, axially extending hooks 19. The band may be made expansible and contractible by being made discontinuous, and may be provided with the previously described expansion and contraction means. It may have peripherally spaced holes 20 providing for attachment of the cross strands.

In this modification the hooks 19 are made to embrace both the inside and outside of the edge of the rim 3 so as to prevent the points of the hooks from slipping down between the wheel rim and the tire 5. No provision is made for the outwardly facing channel arrangement. The hook 17 is shown as a simple harness snap type hook.

Further simplification may be effected by the modification illustrated by Figs. 12 and 13. In this instance there is simply a loop of metal band 21 which may be provided with the previously described expansion and contraction means, and which has one integral edge formed to provide an annular hook 22 similar in shape and function to the separate hooks 19 of the modification of Figs. 9 through 11. Peripherally spaced holes 23 are provided in the band 21 for the hooks 15 previously described.

The modification shown by Figs. 14 and 15 simply comprise a cylindrically looped metal band 24 having attachment holes 25 at one edge and with its other edge flaring at 26 in the manner of the flare 2 of the first example. In this instance, abutments 27 perform the function of the abutments 4 of the first example, but comprise separate pieces attached to the band 24.

Figs. 16 and 17 illustrate a final suggested modification, although other modifications may be possible, wherein a flat metal band 31 is looped with the band in a radial plane. Metal has sufficient elasticity to permit expansion and contraction of this band when it is split and provided with suitable means for expanding and contracting. The inner periphery of the band 31 is formed to provide an annular hook 28 which engages the wheel rim 3 and the band itself is stamped out to form loops 29 adapted for connections with anti-skid cross chains.

In Fig. 18 the wheel rim 3 itself is formed to provided an integral inwardly facing channel 30. Both rim edges may be provided with such an integral channel. The web of this channel may have holes formed in it as described in connection with the first example, with the channel flanges functioning to guide the hook until a hole is found automatically as previously described. This modification may be used when detachability is not desired.

It is considered desirable to make all parts that fit inside the rim facing the tire side wall, as smooth as possible. This permits the tire to press against these parts without any chance for damage or wear.

As shown by Fig. 3, the wrench portion 12 of the contracting and expanding screw 11 may have holes 12a for receiving a nail for turning the screw. This eliminates the need for a wrench. Furthermore, the holes 12a may be dimensioned so that the largest nail that will fit is too weak to permit stripping the threads of the screw or of the lugs 10 without the nail bending.

When the two annuli are applied to a wheel with the lugs 10 and screws 11 diametrically opposite, wheel unbalance is avoided. Preferably the cross strand attachment holes are aligned on opposite sides of the wheel so that the holes visible on the outside of the wheel provide an indication of the location of the holes on the inside where they cannot be seen.

I claim:

1. An anti-skid device including the combination of an automobile vehicle wheel having a rim adapted to mount a tire thereon, said rim having inside and outside peripheral portions which respectively extend axially respecting said wheel towards and away from the vehicle, a radially inwardly facing annular channel connected to said inside peripheral portion and having a substantially smooth bottom through which a plurality of interspaced holes are formed radially, a plurality of anti-skid cross chains each having secured to one end a long shank terminating with a hook havink a point proportioned and shaped to engage in said channel and to slide peripherally on said bottom and to enter any of said holes upon sliding to the same, the other end of each of said chains having a releasably locking device secured thereto, and means connected to said outside portion of said rim for engagement with said lockink means at locations substantially corresponding to the locations of said holes.

2. An anti-skid device including the combination of an automobile vehicle wheel having a rim adapted to mount a tire thereon, said rim having inside and outside peripheral portions which respectively extend axially respecting said wheel towards and away from the vehicle, a radially inwardly facing annular channel connected to said inside peripheral portion and having a substantially smooth bottom through which a plurality of interspaced holes are formed radially, a plurality of anti-skid cross chains each having secured to one end a long shank terminating with a hook having a point proportioned and shaped to engage in said channel and to slide peripherally on said bottom and to enter any of said holes upon sliding to the same, the other end of each of said chains having a releasably lockink device secured thereto, and means connected to said outside portion of said rim for engagement with said locking means at locations substantially corresponding to the locations of said holes, said channel being formed by an expansible and contractible annulus having a hook-shaped side edge portion releasably overlying said inside peripheral portion of said rim and having abutments spaced from said side edge portion and engaging said inside portion of said rim and limiting the distance said side edge portion of said annulus overlies said inside peripheral portion of said rim; and means for expanding and contracting said annulus.

3. An anti-skid device including the combination of an automobile vehicle wheel having a rim adapted to mount a tire thereon, said rim having inside and outside peripheral portions which respectively extend axially respecting said wheel towards and away from the vehicle, a radially inwardly facing annular channel connected to said insider peripheral portion and having a substantially smooth bottom through which a plurality of interspaced holes are formed radially, a plurality of anti-skid cross chains each having secured to one end a long shank terminating with a hook having a point proportioned and shaped to engage in said channel and to slide peripherally on said bottom and to enter any of said holes upon sliding to the same, the other end of each of said chains having a releasably locking device secured thereto, and means connected to said outside portion of said rim for engagement with said locking means at locations substantially corresponding to the locations of said holes, said channel being formed by an expansible and contractible annulus having a hook-shaped side edge portion releasably overlying said inside peripheral portion of said rim and having abutments spaced from said side edge portion and engaging said inside portion of said rim and limiting the distance said side edge portion of said annulus overlies said inside peripheral portion of said rim, and means for expanding and contracting said annulus, said annulus being formed from a sheet metal band looped with its ends adjacent and having opposite to said hook-shaped side edge portion a side edge portion formed into a radially inwardly extending tubular shape and having a split loop of wire inside of said tubular shape with its ends defining its split offset from said band's adjacent ends and located inside of said tubular shape, said expanding and contracting means comprising lugs secured to said ends of said band and having oppositely threaded holes and a correspondingly threaded screw rotatively screwed through said threaded holes.

4. An anti-skid device including the combination of an automobile vehicle wheel having a rim adapted to mount a tire thereon, said rim having inside and outside peripheral portions which respectively extend axially respecting said wheel towards and away from the vehicle, a radially inwardly facing annular channel connected to said inside peripheral portion and having a substantially smooth bottom through which a plurality of interspaced holes are formed radially, a plurality of anti-skid cross chains each having secured to one end a long shank terminating with a hook having a point proportioned and shaped to engage in said channel and to slide peripherally on said bottom and to enter any of said holes upon sliding to the same, the other end of each of said chains having a releasably locking device secured thereto, and means connected to said outside portion of said rim for engagement with said locking means at locations substantially corresponding to the locations of said holes, said means comprising a channel corresponding to the first-named channel and secured to said outside portion of said rim with the corresponding holes of the two channels substantially opposite to each other.

IRVING B. PURDY.

REFERENCES CITED

The following references are of record in the file of this patent:

UNITED STATES PATENTS

| Number | Name | Date |
| --- | --- | --- |
| 1,102,103 | Steigerwald | June 30, 1914 |
| 1,277,278 | Whistler | Aug. 27, 1918 |
| 1,718,874 | Paull | June 25, 1929 |
| 2,241,592 | Goldenberg | May 13, 1941 |
| 2,255,350 | Devlin | Sept. 9, 1941 |
| 2,474,521 | Fogarty | June 28, 1949 |